US007075881B2

(12) United States Patent
Fujita et al.

(10) Patent No.: US 7,075,881 B2
(45) Date of Patent: Jul. 11, 2006

(54) SIGNAL RECORDING/PLAYBACK APPARATUS, AND RECORDING COMPENSATION METHOD AND PLAYBACK METHOD USED THEREFOR

(75) Inventors: Goro Fujita, Kanagawa (JP); Tetsuhiro Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 806 days.

(21) Appl. No.: 10/173,043

(22) Filed: Jun. 18, 2002

(65) Prior Publication Data
US 2002/0191496 A1    Dec. 19, 2002

(30) Foreign Application Priority Data
Jun. 19, 2001    (JP)    ............... 2001-184297

(51) Int. Cl.
*G11B 7/24* (2006.01)
*G11B 7/00* (2006.01)
(52) U.S. Cl. ............ 369/116; 369/275.3; 369/47.5; 369/30.12
(58) Field of Classification Search ............ 369/116, 369/275.3, 275.1, 47.5, 30.12, 59.12, 13.02, 369/13.24, 124.02, 124.04, 47.1, 47.15, 47.13, 369/30.03
See application file for complete search history.

(56) References Cited

U.S. PATENT DOCUMENTS

| 5,416,766 | A | * | 5/1995 | Horimai | ............... 369/116 |
| 5,544,137 | A | * | 8/1996 | Ohara et al. | ............ 369/47.5 |
| 6,657,947 | B1 | * | 12/2003 | Ishizaki et al. | ......... 369/275.3 |

\* cited by examiner

*Primary Examiner*—Ali Neyzari
(74) *Attorney, Agent, or Firm*—Oblon, Spivak, McClelland, Maier & Neustadt, P.C.

(57) ABSTRACT

A signal recording/playback apparatus includes a recording data converter. The recording data converter converts on a data pattern having a large influence on adjacent tracks on an optical disk, and outputs the converted data to an optical pickup. Specifically, by performing a data converting process in which, for a data pattern having a predetermined length of at least consecutive bits having identical values, part of the bits is inverted based on a conversion table, the recording data converter compensates a recording operation. Alternatively, instead of inverting the bits, by controlling the output power and pulse width of a laser, the recording operation is compensated. The signal recording/playback apparatus includes a played-back data converter. In the data playback mode of the signal recording/playback apparatus, the data converted by the recording data converter is identified and decoded into the original data by the played-back data converter. The played-back data converter outputs the original data.

12 Claims, 4 Drawing Sheets

FIG. 2

| | 0 | 1 | 1 | 0 | | | | | | ⇨ | 0 | 1 | 1 | 0 | | | | | |
|---|---|---|---|---|---|---|---|---|---|---|---|---|---|---|---|---|---|---|---|
| | 0 | 1 | 1 | 1 | 0 | | | | | ⇨ | 0 | 1 | 1 | 1 | 0 | | | | |
| | 0 | 1 | 1 | 1 | 1 | 0 | | | | ⇨ | 0 | 1 | 1 | 1 | 1 | 0 | | | |
| | 0 | 1 | 1 | 1 | 1 | 1 | 0 | | | ⇨ | 0 | 1 | 1 | 0 | 1 | 1 | 0 | | |
| | 0 | 1 | 1 | 1 | 1 | 1 | 1 | 0 | | ⇨ | 0 | 1 | 1 | 0 | 1 | 1 | 1 | 0 | |
| | 0 | 1 | 1 | 1 | 1 | 1 | 1 | 1 | 0 | ⇨ | 0 | 1 | 1 | 1 | 0 | 1 | 1 | 1 | 0 |
| | 0 | 1 | 1 | 1 | 1 | 1 | 1 | 1 | 1 | 0 | ⇨ | 0 | 1 | 1 | 0 | 1 | 1 | 1 | 1 | 0 |
| | 1 | 0 | 0 | 1 | | | | | | ⇨ | 1 | 0 | 0 | 1 | | | | | |
| | 1 | 0 | 0 | 0 | 1 | | | | | ⇨ | 1 | 0 | 0 | 0 | 1 | | | | |
| | 1 | 0 | 0 | 0 | 0 | 1 | | | | ⇨ | 1 | 0 | 0 | 0 | 0 | 1 | | | |
| | 1 | 0 | 0 | 0 | 0 | 0 | 1 | | | ⇨ | 1 | 0 | 0 | 1 | 0 | 0 | 1 | | |
| | 1 | 0 | 0 | 0 | 0 | 0 | 0 | 1 | | ⇨ | 1 | 0 | 0 | 1 | 0 | 0 | 0 | 1 | |
| | 1 | 0 | 0 | 0 | 0 | 0 | 0 | 0 | 1 | ⇨ | 1 | 0 | 0 | 0 | 1 | 0 | 0 | 0 | 1 |
| | 1 | 0 | 0 | 0 | 0 | 0 | 0 | 0 | 0 | 1 | ⇨ | 1 | 0 | 0 | 0 | 1 | 0 | 0 | 0 | 0 | 1 |

FIG. 3

| | 0 | 1 | 1 | 0 | | | | | | ⇨ | 0 | 1 | 1 | 0 | | | | | |
|---|---|---|---|---|---|---|---|---|---|---|---|---|---|---|---|---|---|---|---|
| | 0 | 1 | 1 | 1 | 0 | | | | | ⇨ | 0 | 1 | 1 | 1 | 0 | | | | |
| | 0 | 1 | 1 | 1 | 1 | 0 | | | | ⇨ | 0 | 1 | 1 | 1 | 1 | 0 | | | |
| | 0 | 1 | 1 | 1 | 1 | 1 | 0 | | | ⇨ | 0 | 1 | 1 | 1 | 1 | 1 | 0 | | |
| | 0 | 1 | 1 | 1 | 1 | 1 | 1 | 0 | | ⇨ | 0 | 1 | 1 | 1 | 1 | 1 | 1 | 0 | |
| | 0 | 1 | 1 | 0 | 1 | 1 | 1 | 0 | | ⇨ | 0 | 1 | 1 | 1 | 1 | 1 | 1 | 0 | |
| | 0 | 1 | 1 | 1 | 0 | 1 | 1 | 1 | 0 | ⇨ | 0 | 1 | 1 | 1 | 1 | 1 | 1 | 1 | 0 |
| | 1 | 0 | 0 | 1 | | | | | | ⇨ | 1 | 0 | 0 | 1 | | | | | |
| | 1 | 0 | 0 | 0 | 1 | | | | | ⇨ | 1 | 0 | 0 | 0 | 1 | | | | |
| | 1 | 0 | 0 | 0 | 0 | 1 | | | | ⇨ | 1 | 0 | 0 | 0 | 0 | 1 | | | |
| | 1 | 0 | 0 | 1 | 0 | 0 | 1 | | | ⇨ | 1 | 0 | 0 | 0 | 0 | 0 | 1 | | |
| | 1 | 0 | 0 | 1 | 0 | 0 | 0 | 1 | | ⇨ | 1 | 0 | 0 | 0 | 0 | 0 | 0 | 1 | |
| | 1 | 0 | 0 | 0 | 1 | 0 | 0 | 0 | 1 | ⇨ | 1 | 0 | 0 | 0 | 0 | 0 | 0 | 0 | 1 |
| | 1 | 0 | 0 | 0 | 1 | 0 | 0 | 0 | 0 | 1 | ⇨ | 1 | 0 | 0 | 0 | 0 | 0 | 0 | 0 | 0 | 1 |

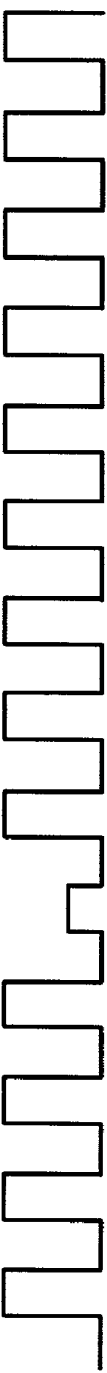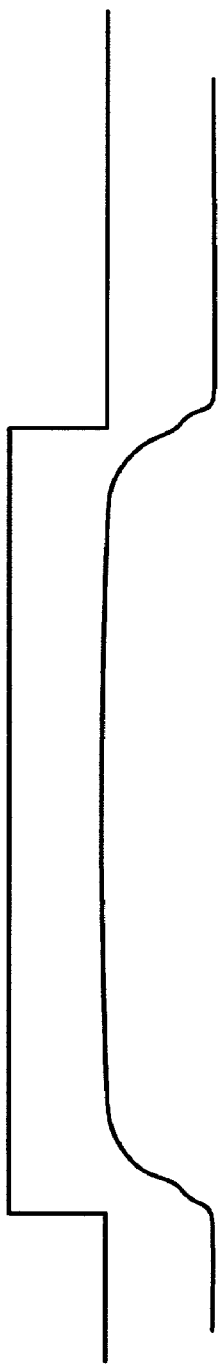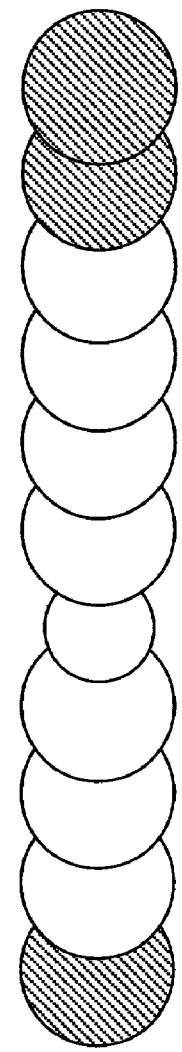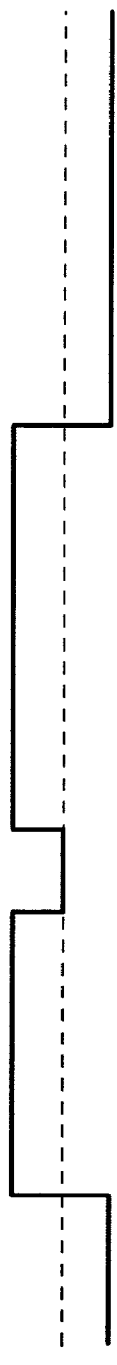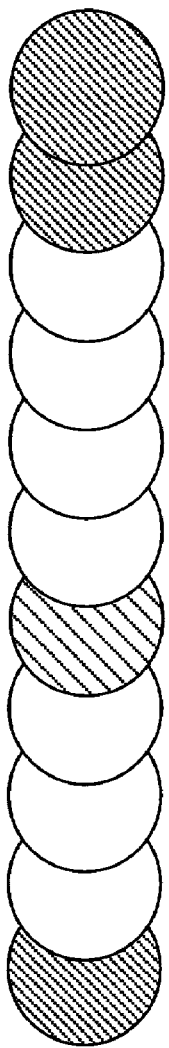
FIG. 5A
FIG. 5B
FIG. 5C
FIG. 5D
FIG. 5E
FIG. 5F
FIG. 5G

SIGNAL RECORDING/PLAYBACK APPARATUS, AND RECORDING COMPENSATION METHOD AND PLAYBACK METHOD USED THEREFOR

BACKGROUND OF THE INVENTION

1. Field of the Invention

The present invention relates to an optical signal recording/playback apparatus that records or plays back various types of information recorded on an optical recording medium such as an optical disk, and a recording compensation method and a playback method which are used therefor.

2. Description of the Related Art

Conventionally, various optical-signal recording/playback apparatuses using optical disks have been provided. These apparatuses include playback-only apparatuses using playback-only optical disks such as compact disks (CDs), and recording and playback apparatuses using rewritable optical disks such as magnetooptical disks and phase-change disks. In this description, disks in accordance with different types of formats are collectively referred to as "optical disks".

A method in which data coded by a data coding system having a predetermined mark-length limitation is recorded on an optical disk, as disclosed in Japanese Unexamined Patent Application Publication No. 10-283636, is known as one of signal recording methods for the above optical-signal recording/playback apparatuses.

In this method, signals are recorded on or played back from an optical disk by setting the shortest mark length as 2T and the longest mark length as 8T when each mark length is represented by a multiple of a recording-pulse period T.

For increasing the density of recording signals in the track direction of the optical disk in the above optical-signal recording/playback apparatuses, interference (crosstalk) and destruction (cross-write/cross-erase) between adjacent tracks must be prevented. These cause inability in increasing the density.

For example, in optical modulating recording that outputs modulated light by controlling the switching of a light source, when a long mark is recorded, storage of heat laterally expands each optical spot, thus increasing crosstalk and cross-erase.

In addition, in magnetooptically magnetic-modulating recording, when a long mark is recorded, a leakage magnetic field is enhanced and operates as an applied magnetic field bias for recording. This hinders preferable recording.

SUMMARY OF THE INVENTION

Accordingly, it is an object of the present invention to provide a signal recording/playback apparatus which effectively prevents crosstalk, cross-erase, etc., between adjacent tracks in long-mark-recorded portions, and which achieves a high data-recording density on a recording medium, and a recording compensation method and a playback method which are used therefor.

To this end, according to an aspect of the present invention, a signal recording apparatus for performing coded-data recording onto an optical recording medium is provided. The signal recording apparatus includes a recording unit for recording coded data on the optical recording medium, and a recording compensation unit for, in the recording mode of the signal recording apparatus, controlling each data pattern having a large influence on adjacent tracks on the optical recording medium so as to reduce the influence.

According to another aspect of the present invention, a signal playback apparatus is provided which includes a playback unit which plays back signals recorded on an optical recording medium, and a playback-processing unit which, when a data pattern being incapable of existing in data coding having signal-length limitation is played back, determines that the data pattern is data processed by recording compensation, and performs predetermined decoding.

According to a recording method for performing coded data recording onto an optical recording medium is provided. The recording method includes a compensation step for controlling a data pattern having a large influence on adjacent tracks on the optical recording medium so that the influence is reduced, and a recording step for, based on the controlled data pattern, performing the coded data recording onto the optical recording medium.

According to another aspect of the present invention, a playback method for playing back a signal recorded on an optical recording medium is provided. The playback method includes the steps of, when a data pattern being incapable of existing in data coding having signal-length limitation is played back, determining that the data of the data pattern is data processed by recording compensation, and performing predetermined decoding on the data of the pattern.

According to an optical recording apparatus, a data pattern having a large influence on adjacent tracks on an optical recording medium is recorded in a form in which the influence is reduced by using a recording unit to perform conversion of the data pattern.

Therefore, for example, in a long-mark-recorded portion, an influence on adjacent tracks can be reduced and crosstalk, cross-erase, etc., between adjacent tracks can be effectively prevented, so that an increased recording density of an optical recording medium can be achieved.

In addition, according to a signal playback apparatus of the present invention, when a data pattern that is incapable of existing in data coding having signal-data limitation is played back, the data of the pattern is identified as data processed by recoding compensation, and is decoded in a predetermined manner before being output. This makes it possible to effectively play back also the data recorded on the optical recording medium by the above signal recording apparatus so that the influence on the adjacent tracks is reduced.

According to a recording compensation method of the present invention for the above signal recording apparatus, a data pattern having a large influence on adjacent tracks on an optical recording medium is recorded in a form in which the influence is reduced by using a recording unit to perform conversion of the data pattern.

Therefore, for example, in a long-mark-recorded portion, an influence on adjacent tracks can be reduced and crosstalk, cross-erase, etc., between adjacent tracks can be effectively prevented, so that an increased recording density of an optical recording medium can be achieved.

Also, according to a playback method of the present invention for the above signal playback apparatus, when a data pattern that is incapable of existing in data coding having signal-data limitation is played back, the data of the pattern is identified as data processed by recoding compensation, and is decoded in a predetermined manner before being output. This makes it possible to effectively play back also the data recorded on the optical recording medium by the above signal recording apparatus so that the influence on the adjacent tracks is reduced.

BRIEF DESCRIPTION OF THE DRAWINGS

FIG. 2 is a recording compensation conversion table for use in recording compensation in the signal recording/playback apparatus shown in FIG. 1;

FIG. 3 is a playback conversion table for use in playing back data recorded in a form converted by the recording compensation conversion table shown in FIG. 2;

FIGS. 5A, 5B, 5C, 5D, 5E, 5F, and 5G show a timing chart indicating a recording operation performed by the signal recording/playback apparatus shown in FIG. 1 when it uses a second recording compensation method.

DESCRIPTION OF THE PREFERRED EMBODIMENTS

A signal recording/playback apparatus, a recording compensation method, and a playback-processing method according to embodiments of the present invention are described below.

The following embodiments are preferred, specific examples of the present invention, and include various, technically preferable limitations. However, the scope of the present invention is not limited to the embodiments unless the present invention is particularly limited in the following description.

Figure 1:
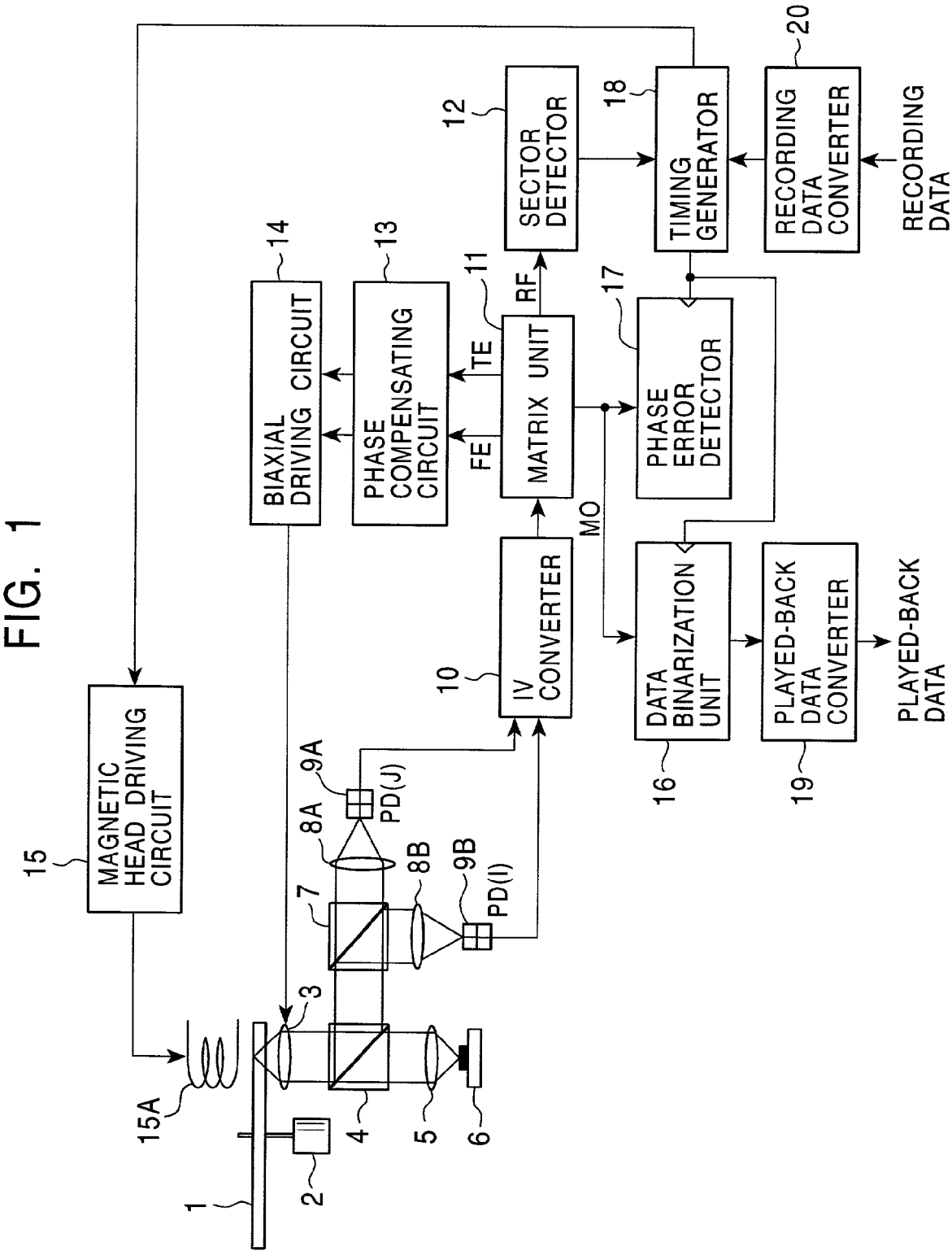
FIG. 1 is a block diagram showing the entire structure of a signal recording/playback apparatus according to an embodiment of the present invention.

FIG. 1 is a block diagram showing the entire structure of a signal recording/playback apparatus according to an embodiment of the present invention.

As FIG. 1 shows, the signal recording/playback apparatus includes an optical disk 1, a spindle motor 2, an objective lens 3, beam splitters 4 and 7, a collimating lens 5, a laser diode 6, condensing lenses 8A and 8B, photodetectors (PDs) 9A and 9B, a current-to-voltage (IV) converter 10, a matrix unit 11, a sector detector 12, a phase-compensating circuit 13, a biaxial driving circuit 14, a magnetic head driving circuit 15, a data binarization unit 16, a phase error detector 17, a timing generator 18, a played-back data converter 19, and a recording data converter 20.

The signal recording/playback apparatus according to the embodiment uses mark-length-limiting data coding to record and play back coded data. Accordingly, as FIG. 1 shows, the signal recording/playback apparatus includes the played-back data converter 19 and the recording data converter 20.

The recording data converter 20 is an example of a recording compensation means that, in a data recording mode, performs data conversion on a data pattern having a large influence on adjacent tracks on the optical disk 1, and outputs the converted data to an optical pickup (not shown). The details of the recording data converter 20 are described later. In this embodiment, the recording data converter 20 is formed as an encoder that performs a data converting process in which, in a data pattern having at least a predetermined number of consecutive bits having identical values, at least one bit is inverted based on a recording compensation conversion table (described later).

The played-back data converter 19 is an example of a playback-processing means in which, in a data playback mode, the data converted by the recording data converter 20 is identified, and the converted data is decoded based on a playback conversion table (described later) into the original data before it is output.

Other components are described below with reference to FIG. 1.

A laser beam from the laser diode 6 is emitted onto the signal recording surface of the optical disk 1 through the collimating lens 5, the beam splitter 4, and the objective lens 3. The laser beam reflected by the signal recording surface of the optical disk 1 is split by the beam splitters 4 and 7, and the split beams are received by the PDs 9A and 9B through the condensing lenses 8A and 8B.

Detection current signals from the PDs 9A and 9B are converted into a detection voltage signal by the IV converter 10, and the voltage signal is input to the matrix unit 11. From the input voltage signal, the matrix unit 11 generates main playback signals such as an RF signal and an MO signal, and servo signals such as a focusing error (FE) signal and a tracking error (TE) signal.

The RF signal generated by the matrix unit 11 is input to the sector detector 12. For each sector of the optical disk 1, a sector signal is detected and input to the timing generator 18. The input sector signal is used as a timing signal for use in a recording operation and a playback operation.

The MO signal generated by the matrix unit 11 is input to the data binarization unit 16 and the phase error detector 17. The input MO signal is decoded into binarized data by the data binarization unit 16, and is output as played-back data through the played-back data converter 19.

The objective lens 3 is provided to a biaxial actuator (not shown) and is servo-controlled in focusing and tracking directions by the biaxial driving circuit 14.

Also, in the data recording mode, the magnetic head driving circuit 15 uses a magnetic head 15A to apply a magnetic field to the optical disk 1.

Next, the details of a recording compensation method and a playback-processing method in the above-described signal recording/playback apparatus are described below.

FIG. 2 is a recording compensation conversion table for use in recording compensation in the above-described signal recording/playback apparatus.

FIG. 3 is a playback conversion table for use in playing back data recorded in a form converted by the recording compensation conversion table shown in FIG. 2.

In the examples shown in FIGS. 2 and 3, recording and playback of data based on the run-length-limited conversion RLL (1, 7) are performed. Regarding a mark-length limitation for use in recording the data to the optical disk 1, when each mark length is represented by a multiple of the period T (bits) of recording laser-diode pulses, the shortest mark length is set at 2T (bits) and the longest mark length is set at 8T (bits) for recording and playing back signals on the optical disk 1.

In other words, in this embodiment, data recorded on the optical disk 1 has a configuration in which the shortest unit has two consecutive bits having identical values, and at the start and end thereof, inverted bits are respectively positioned. When each mark is represented by "0", the configuration is represented by "1001". When each mark is represented by "1", the configuration is represented by "0110".

Therefore, in a data string having such consecutive pieces of recording data, even in the minimum, each set of two consecutive bits of "1" or "0" is positioned. Thus, it is impossible for only a single bit of "1" or "0" to exist independently.

Accordingly, in this embodiment, when there are at least five consecutive bits having identical values in the recording compensation conversion table, by inverting one bit almost in the center of the consecutive bits, crosstalk and cross-erase between adjacent tracks due to recording of the long mark are reduced.

Also, in the playback conversion table shown in FIG. 3, by detecting only a single inverted bit, and performing conversion so that the inverted bit is returned to the original bit, data that is obtained before the recording compensation is restored.

Figure 4A:
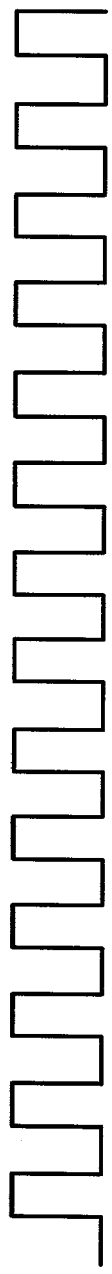
FIGS. 4A, 4B, 4C, 4D, 4E, 4F, and 4G show a timing chart comparatively indicating a recording operation performed by the signal recording/playback apparatus shown in FIG. 1 when it uses a first recording compensation method and a recording operation performed when the signal recording/playback apparatus shown in FIG. 1 does not compensate recording.
Figure 4B:
Figure 4C:
Figure 4D:
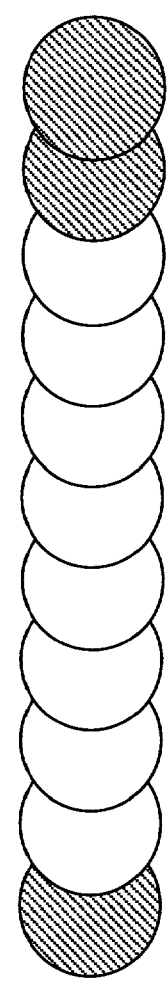
Figure 4E:
Figure 4F:
Figure 4G:
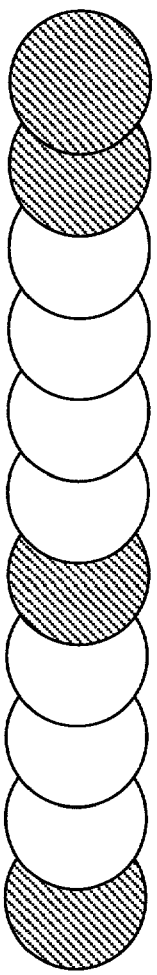

FIGS. 4A, 4B, 4C, 4D, 4E, 4F, and 4G show a timing chart comparatively indicating a recording operation performed by the signal recording/playback apparatus shown in FIG. 1 when it uses a first recording compensation method and a recording operation performed when the signal recording/playback apparatus shown in FIG. 1 does not compensate recording. FIG. 4A shows recording laser-diode pulses. FIG. 4B shows recording data. FIG. 4C shows a recording magnetic field. FIG. 4D shows recorded marks. FIG. 4E shows recording data. FIG. 4F shows a recording magnetic field. FIG. 4G shows recorded marks.

When the recording compensation method according to the embodiment is not used, for recording laser-diode pulses (shown in FIG. 4A), recording data (shown in FIG. 4B) corresponding to eight bits as the longest mark is sent to the optical head, and by applying a recording magnetic field (shown in FIG. 4C) with this timing, marks corresponding to eight bits are recorded, as shown in FIG. 4D.

Accordingly, in this case, by switching on the laser diode 6 in accordance with eight consecutive bits, storage of heat laterally expands the optical spots, thus causing large crosstalk and cross-erase.

In addition, when the recording compensation method according to the embodiment is used, among the recording data corresponding to the eight bits, the fourth bit is turned off (inverted bit), as shown in FIGS. 4E and 4G. With this timing, the recording magnetic field is also weakened, as shown in FIG. 4F.

In this case, the laser diode 6 is consecutively switched on for three or four bits, so that the expansion of the optical spots due to the storage of heat is suppressed, and the crosstalk and cross-erase can be reduced.

As a result, a reduction in the crosstalk and cross-erase between adjacent tracks is realized, thus achieving an increase in the recording density.

When the data recorded as described above is played back, it can be restored to the original data by using the playback conversion table shown in FIG. 3.

Although the above embodiment uses data conversion to compensate recording, similar advantages can be obtained by, as another method, changing the recording conditions for the optical pickup when recording a long mark.

Specifically, instead of converting the recording data, by changing the output power level of the optical pickup, the width of the output pulses, the recording magnetic field level, etc., the recorded states of the central portion of the long mark is controlled, so that crosstalk and cross-erase can be reduced.

FIGS. 5A, 5B, 5C, 5D, 5E, 5F, and 5G show a timing chart indicating a recording operation performed by the signal recording/playback apparatus shown in FIG. 1 when it records the longest mark. FIG. 5A shows recording laser-diode pulses. FIG. 5B shows recording data. FIG. 5C shows a recording magnetic field. FIG. 5D shows recorded marks. FIG. 5E shows recording data. FIG. 5F shows a recording magnetic field. FIG. 5G shows recorded marks.

Based on the timing signal from the timing generator 18, a driving circuit (not shown) that drives the laser diode 6 controls the size of each recorded mark, as shown in FIG. 5D, by changing the recording laser-diode pulses shown in FIG. 5A. Also, regarding another example, as FIGS. 5E to 5G show, based on the timing signal from the timing generator 18, the magnetic head driving circuit 15 changes the recording magnetic field. The other points are similar to those described in the above embodiments (FIGS. 1 to 4G).

The above-described embodiments have been described in the case of using a single signal recording/playback apparatus having, in combination, the functions of the signal recording apparatus and the signal playback apparatus of the present invention. However, the present invention may be embodied as a recording-only signal recording apparatus or a playback-only signal playback apparatus.

The optical recording medium is not limited to a magnetooptical disk, but may be another type of optical disk. Also, an optical card medium, etc., may be similarly used as the optical recording medium.

What is claimed is:

1. A signal recording apparatus for performing coded-data recording onto an optical recording medium, said signal recording apparatus comprising:
   recording means for recording coded data on said optical recording medium;
   recording compensation means for, in the recording mode of said signal recording apparatus, controlling each data pattern having a large influence on adjacent tracks on said optical recording medium so as to reduce the influence, wherein
   said recording compensation means converts the data pattern and outputs the converted data pattern to said recording means, and
   said recording compensation means converts the data pattern by, in data coding having signal-data limitation, inverting at least one bit in a data pattern having at least a predetermined number of consecutive bits having identical values.

2. A signal recording apparatus according to claim 1, wherein, in response to at least one bit in a data pattern having at least a predetermined number of consecutive bits having identical values, said recording compensation means changes the recording conditions in data coding having signal-data limitation.

3. A signal recording apparatus according to claim 2, wherein the recording conditions include an output power level for an optical pickup.

4. A signal recording apparatus according to claim 2, wherein the recording conditions include the width of output pulses from an optical pickup.

5. A signal recording apparatus according to claim 2, wherein the recording conditions include a recording magnetic field level for a magnetic head.

6. A signal playback apparatus comprising:
   playback means which plays back signals recorded on an optical recording medium; and
   playback-processing means which, when a data pattern being incapable of existing in data coding having signal-length limitation is played back, determines that the data pattern is data processed by recording compensation, and performs predetermined decoding, and wherein said playback means inverts a number of consecutive bits having identical values which is less than the shortest value based on the signal-length limitation.

7. A recording method for performing coded data recording onto an optical recording medium, said recording method comprising:
   a compensation step for controlling a data pattern having a large influence on adjacent tracks on said optical recording medium so that the influence is reduced; and
   a recording step for, based on the controlled data pattern, performing the coded data recording onto the optical recording medium,
   wherein the step of converting the data pattern includes the step of inverting at least one bit in a data pattern having at least a predetermined number of consecutive bits having identical values in data coding having signal-data limitation, and
   wherein the step of converting the data pattern includes the step of inverting at least one bit in a data pattern having at least a predetermined number of consecutive bits having identical values in data coding having signal-data limitation.

8. A recording method according to claim 7, wherein said compensation step includes the step of controlling recording conditions for recoding means in response to the data pattern, wherein in the step of controlling the recording conditions, in data coding having signal-data limitation, the recording conditions are changed in response to at least one bit in a data pattern having at least a predetermined number of consecutive bits having identical values.

9. A recording method according to claim 8, wherein the recording conditions include an output power level for an optical pickup.

10. A recording method according to claim 8, wherein the recording conditions include the width of output pulses from an optical pickup.

11. A recording method according to claim 8, wherein the recording conditions include a recording magnetic field level of a magnetic head.

12. A playback method for playing back a signal recorded on an optical recording medium, said playback method comprising the step of:
   when a data pattern being incapable of existing in data coding having signal-length limitation is played back, determining that the data of the data pattern is data processed by recording compensation,
   performing predetermined decoding on the data of the data pattern, and
   wherein the step of performing the predetermined decoding includes a step of inverting a number of consecutive bits having identical values which is less than the shortest value based on the signal-length limitation.

* * * * *